United States Patent [19]

Rupert

[11] Patent Number: 4,786,777

[45] Date of Patent: Nov. 22, 1988

[54] PROCESS AND APPARATUS FOR WIRE ELECTRODE TRIMMING USING A LASER

[75] Inventor: Gary F. Rupert, Ann Arbor, Mich.

[73] Assignee: Raycon Textron Inc., Ann Arbor, Mich.

[21] Appl. No.: 170,770

[22] Filed: Mar. 21, 1988

[51] Int. Cl.$^4$ .................... B23H 7/22; B23H 9/14
[52] U.S. Cl. .................. 219/69 E; 219/69 M; 219/121.74
[58] Field of Search ............... 219/69 M, 69 E, 68, 219/69 R, 121 LG, 121 LH, 121 LJ, 121 LP, 121 LQ, 121 LR, 121 LX, 69 W, 121 EJ, 121 EK, 121 PD, 121 PE; 204/129.1, 129.2, 129.35, 157.41, 206, 280; 51/165, 87

[56] References Cited

U.S. PATENT DOCUMENTS

| | | |
|---|---|---|
| 3,816,272 | 6/1974 | Joslin ............................ 204/129.1 |
| 4,044,216 | 8/1977 | Check et al. .................. 219/69 E |
| 4,131,782 | 12/1978 | Einstein et al. ............... 219/121 EK |
| 4,188,522 | 2/1980 | Baker ............................ 219/69 M |
| 4,596,066 | 6/1986 | Inoue ............................ 219/69 M |

FOREIGN PATENT DOCUMENTS

| | | | |
|---|---|---|---|
| 2920482 | 11/1980 | Fed. Rep. of Germany .... | 219/69 E |
| 3533001 | 3/1987 | Fed. Rep. of Germany .... | 219/69 E |
| 238086 | 10/1987 | Japan . | |

OTHER PUBLICATIONS

"Ion Beam Machining of Very Sharp Points", by Dietrich et al., IBM, Tech. Discl. Bulletin, vol. 27, No. 5, Oct. 1984.

Primary Examiner—A. D. Pellinen
Assistant Examiner—Geoffrey S. Evans
Attorney, Agent, or Firm—John C. Evans

[57] ABSTRACT

Apparatus and a process for trimming the tip of a spark erosion electrode includes a mirror system for selectively diverting a hole drilling laser beam through a path which intersects the tip of an electrode used to finish laser holes by spark erosion of the walls of the laser formed hole. The apparatus includes one mirror unit which is selectively positioned to intercept the hole drilling laser beam for diverting it for electrode trimming. The process includes the steps of sequentially forming a plurality of holes in a part by first directing a laser beam against the part to form a rough hole therethrough and then directing the flat ended tip of a wire electrode through the rough hole and applying a predetermined current pulse from the electrode to the part to spark erode the rough hole to a precision shape; and noncontact dressing the wire electrode when a taper is eroded therein at intervals during the sequential hole formation to reshape the wire electrode to form a flat surface tip thereon without the formation of burrs or whiskers at the periphery thereof.

13 Claims, 2 Drawing Sheets

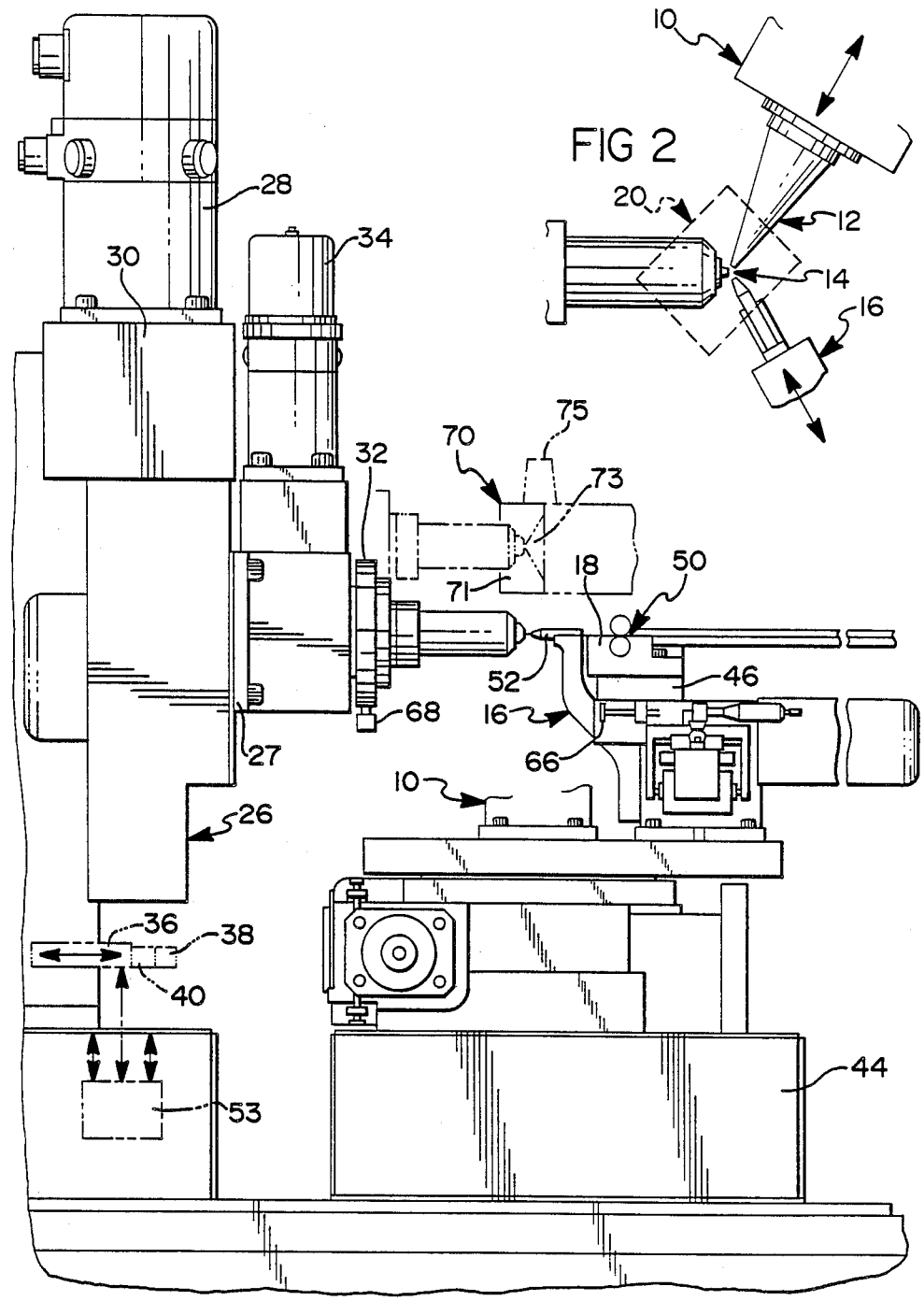

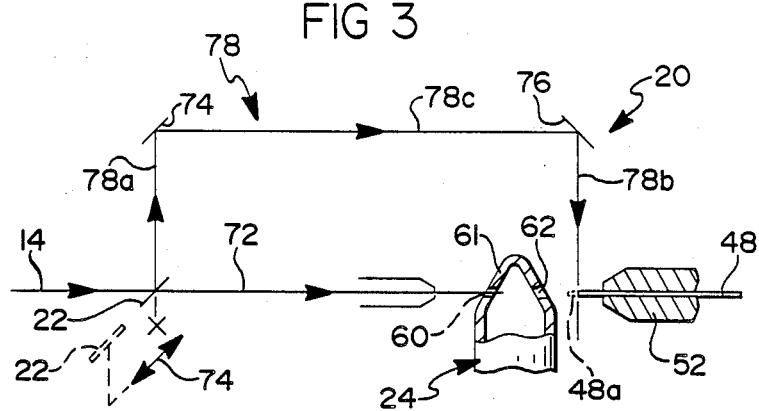
FIG 3
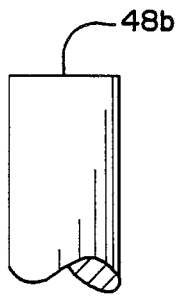
FIG 4
FIG 5
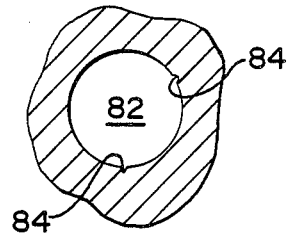
FIG 6
FIG 7

PROCESS AND APPARATUS FOR WIRE ELECTRODE TRIMMING USING A LASER

TECHNICAL FIELD

The present invention relates generally to precision drilling systems, and more particularly to apparatus and a process for trimming the tip of a spark erosion electrode.

In copending U.S. Ser. No. 060,827, filed June 12, 1987, with a common assignee, undersized holes are frrst formed by a laser to reduce the cycle time for penetration of the hole through the part. The part is then finished by electrical discharge machining. A wire electrode of an electrical discharge machine is advanced through the previously laser formed undersized hole which is sized to provide an annular flow path for unidirectional flow of electrolyte during an EDM process. The flow path is sized so that particles produced during the EDM process will be flushed from the part by the unidirectional flow of electrolyte. The wire electrode is sized and is connected to a pulse generator to control energy at a spark gap between the wire electrode and a grounded workpiece so as to form a hole of precision dimension and with a microfinished surface thereon.

Wire electrodes used for electrical discharge spark erosion have been dressed by grinding or mechanically cutting an eroded taper formed on the end of the electrode periodically during a spark erosion process to reshape the electrode tip to an unworn flat tip configuration.

Such electrode trimming methods have required the addition of grinding or metal cutting apparatus to the machine for carrying out the electrical discharge machining operation. Such additional apparatus increases the costs of the machine and in some cases does not precisely dress the electrode to a desired shape. Specifically, it has been observed that certain electrode types such as tungsten electrodes have a metallurgical structure which includes fibers or filaments that will appear as hair like whiskers at the tip of a ground or cut dressed tip. Grinding a tip to dress it to an unworn flat end configuration has also been observed to form burrs at the edge of the flat end.

SUMMARY OF THE INVENTION

In the present invention a wire electrode trimmer includes a laser source which has its beam periodically diverted to focus on the worn tip of a spark erosion to disassociate the worn tip from the electrode to reshape it in a desired unworn configuration without the formation of burrs or whiskers on the tip end.

In a specific case the laser is a hole drilling laser source in a combined laser/EDM hole drilling machine. The laser source provides the energy to dress the electrode. If eliminates the need for separate dressers and thereby reduces the cost of trimming spark erosion electrodes without forming burrs or whiskers on the reshaped tip.

A feature of the present invention is to provide a process for dressing a tip of an electrode wherein the electrode includes a flat ended tip which is periodically eroded from a flat end configuration to a tapered end shape such process including the steps of: sequentially forming a plurality of holes in a part by directing the flat ended tip of a wire electrode through a part and applying a predetermined current pulse from the electrode to the part to spark erode a hole to a precision shape; and dressing the wire electrode when a taper is eroded therein at intervals during the sequential hole formation to reshape the wire electrode to form a flat surface tip thereon without the formation of burrs or whiskers at the periphery thereof.

Another feature is to provide a process of the preceding paragraph in which the dressing step is a noncontact dressing of the tapered end of the worn wire electrode to reshape it to the unworn flat tip configuration thereof by directing noncontact energy thereagainst.

Yet another feature of the process of the preceding two paragraphs is to provide noncontact dressing by focusing a laser beam on the tip of a worn wire electrode.

Another feature of the present invention is to provide apparatus for drilling and dressing parts comprising: a laser source having an operative laser beam; means including a spark erosion wire electrode having an unworn flat end configuration thereon for forming a hole by spark eroding material therefrom; and mirror means for selectively diverting the laser beam and focusing the diverted laser beam on a worn tapered end of the wire electrode for dressing it to its original unworn flat end configuration.

BRIEF DESCRIPTION OF THE DRAWINGS

FIGS. 1 and 2 are side and top elevational views, respectively, of a combination laser and EDM hole drilling manufacturing cell including the present invention;

FIG. 3 is a diagrammatic view of an apparatus for performing the trim process of the present invention;

FIGS. 4–6 are enlarged sectional views, respectively of an eroded electrode tip; a dressed electrode tip with whiskers and an electrode trip dressed by the present invention; and FIG. 7 is an enlarged sectional view of a hole formed from an electrode trimmed by conventional methods.

DETAILED DESCRIPTION OF THE INVENTION

Referring now to FIGS. 1 and 2, a laser hole drilling station 10 is illustrated. It includes a laser head 12 for producing a laser output beam 14. Station 10 is angularly offset with respect to an EDM hole drilling station 16 having an EDM head 18.

FIG. 3 shows a combined laser drilling and electrode trim apparatus 20 having a movable mirror 22. The workpiece 24 is illustrative, shown as a nozzle tip used for precision fluid flow control and whose performance can be enhanced by practicing the method of the present invention. The invention is equally suitable for use in the manufacture of other devices or parts which require precisely shaped hole configurations formed therethrough.

In the machine cell of FIG. 1, the nozzle workpiece 24 is supported by an indexing platform 26 for movement with respect to the various work stations. The indexing platform 26 more particularly includes a carriage 27 connected to a drive motor 28 and suitable drive gear means 30 to drive carriage 27 into a plurality of vertically displaced locations to locate the nozzle workpiece 24 at the work stations. The workpiece 24 is located on a rotatable plate 32 on the platform 26. The plate 32 is driven by an actuator 34 to position it in a plurality of hole forming indexed positions. Cross-slide 36 supports the platform 26. It is driven by motor 38 and drive gear 40 to position the workpiece 24 at the laser head 12 and the EDM head 18.

The EDM drilling station 16 includes a base 44 with a carriage 46 for feeding a wire electrode 48 for finishing machining undersized laser drilled holes in the nozzle during a precision machining operation of the hole drilling system 10. specifically, the wire electrode passes through a refeed mechanism 50 and a wire guide 52 to the nozzle workpiece 24. The refeed mechanism 50 is adapted to advance the electrode wire relative to the carriage 46 upon retraction of the carriage after each machining operation.

An operating sequence of the cell includes moving the carriage 27 to the laser hole drilling station 12 and to the EDM hole drilling station 16. The machine is controlled by a CNC controller 53 at each such station to position the nozzle workpiece 24 in a preprogrammed sequence at each station to form a desired series of precision microfinished holes therein.

The wire electrode 48 is connected to a suitable power generator of the type set forth in U.S. Pat. No. 4,361,745 issued Nov. 30, 1982 to Rupert et al for Process Control for Electrical Discharge Machining Apparatus is advanced with respect to a workpiece 24.

In such operations, the wire electrode tip is eroded to form a tapered end 48a as shown in FIG. 4 such that the end thereof is no longer a flat surface perpendicular to the electrode axis.

In the present invention, such problems are obviated. Hence, as shown in FIG. 3, the workpiece 24 is positioned so that its tip 61 is aligned with the output beam 14 from the laser head 12. The laser is a Nd-YAG laser.

The laser head 12 is pulsed at a power output level which will produce an undersized laser hole 60 in the nozzle tip 61. In order to meet the final desired nozzle hole specifications, a wall thickness 62 must be removed. Such removal is accomplished by steps including indexing the laser hole into alignment with the EDM hole drilling station 16. The electrode 48 is then advanced into hole 60. As illustrated in FIG. 3, the electrode diameter is selected to define a spark gap to erode the wall 62 of the hole 60 to a precise dimension. The preformed laser hole 60 thereby serves to define a lead-in path which will prevent or substantially reduce the end taper on the electrode as it advances through the hole. Further, flushed erosion products will not interfere with the hole formation process. The resultant hole is capable of desired flow metering characteristics. Further, such holes produce predictable flow exit patterns in nozzles made by use of the method of the present invention.

After each EDM operation, the downward limit of the carriage 46 is sensed by a limit switch 66 which causes plate 32 to be indexed to place the next laser drilled hole at the EDM work station where the wire is directed from the wire guide 52. When the plate 32 is indexed to the position for machining the last laser drilled hole in the nozzle workpiece 24, a limit switch 68 conditions the machine to actuate the drive motors 28, 30 to transfer the workpiece 24 to a flow test station 70. The test station or flow test station 70 includes a stand 71 having a nest 73 therein to receive the nozzle workpiece 24. An air gauge test head 75 is located in overlying relationship to the stand 72 and is adapted to operatively engage the workpiece 24 to measure the air flow capacity thereof. After the testing operation is completed, the nozzle workpiece 24 is transferred from the flow test station 70 to a part unloading station where the part is either accepted or rejected by a known selection process which is based upon the flow result that is obtained at the flow test station 70. Representative flow testing stations and sorting stations for accomplishing such selection of desired workpieces are set forth in copending United States Application Ser. No. 781,115 entitled, "Method and Apparatus for Electric Discharge Machining", now U.S. Pat. No. 4,725,705, owned by the present assignee.

In accordance with the present invention the electrode trimming apparatus 20 includes the moveable mirror 22 which is normally displaced from a laser beam hole drilling path 72. When the wire electrode 48 is eroded to have a FIG. 4 tapered form 48a, the mirror 22 is moved by a slide operator 74 until it intersects the path 72.

Second and third mirrors 74, 76 are fixed to one side of the moveable mirror 22. When the mirror 22 intersects the path 72 it reflects th laser beam to a laser beam trim path 78 including a pair of legs 78a, 78b and a path segment 78c which is offset from and parallel to the hole drilling path 72.

When the mirror 22 is positioned in the solid line position of FIG. 3 it reflects the laser beam 90 degrees against the mirror 74 which in turn reflects the beam 90 degrees to a path parallel but offset to the hole drilling path 72. The beam is then reflect by the mirror 76 into a cutting plane 80 which includes the tapered tip 48a.

The trim beam serves to noncontact trim the electrode 48 to its unworn flat tip configuration shown at 48b in FIG. 6. The use of noncontact precision trimming of the electrode tip prevents the formation of burrs or whiskers as shown at 48c in FIG. 5. The whiskers are found typically when using tungsten metal electrodes. Such electrodes have a metallurgy which results in fiber like formations in a drawn wire electrode. If the electrode is trimmed with a grinder or a metal cutter it has been observed that the fiber formations may remain as whiskers that can affect the roughness of a finished hole 82 by forming a slight irregularity such as shown at 84 in the hole cross-section of FIG. 7.

Although the description of the invention has been given with reference to a particular embodiment, it is not to be construed in a limiting sense. Many variations and modifications will be apparent to those skilled in the art. For a definition of the invention, reference is made to the appended claims.

What is claimed is:

1. A process for dressing a tip of an electrode with a substantially flat ended tip which is periodically eroded from a flat end configuration to a tapered end shape the improvement comprising:

sequentially forming a plurality of spark eroded holes in a part by directing the flat ended tip of a wire electrode through the part and applying a predetermined current pulse from the electrode to the part to spark erode a hole therein; and noncontact dressing the wire electrode when a taper is eroded therein at intervals during the sequential hole formation to reshape the wire electrode to form a flat surface tip thereon without the formation of burrs or whiskers at the periphery thereof.

2. In the process of claim 1, noncontact dressing the tapered end of the worn wire electrode to reshape it to the unworn flat tip configuration thereof by imposing energy thereon to disassociate the tapered end material from the electrode.

3. In the process of claim 2, said noncontact dressing being produced by focusing a laser beam on the tip of a worn wire electrode.

4. A process for dressing a tip of an electrode used in combined laser and spark erosion hole drilling wherein the electrode includes a substantially flat ended tip which is periodically eroded from a flat end configuration to a tapered end shape the improvement comprising:

sequentially forming a plurality of holes in a part by first directing a laser beam against the part to form a rough hole therethrough and then directing the substantially flat ended tip of a wire electrode through the rough hole and applying a predetermined current pulse from the electrode to the part to spark erode the rough hole to a precision shape; and noncontact dressing the wire electrode when a taper is eroded at the end of the wire electrode at intervals during the sequential hole formation to reshape the wire electrode to form a flat surface tip thereon without the formation of burrs or whiskers at the periphery thereof.

5. In the process of claim 4, said noncontact dressing being produced by focusing a laser beam on the tip of a worn wire electrode.

6. In the process of claim 4, sequentially directing said laser beam through first and second paths one of which paths focuses the laser beam on a part to drill a rough hole in the part and the other of which paths focuses the laser beam on the tapered electrode tip for cutting the tapered end therefrom to shape a unworn flat tip configuration on the electrode for subsequent spark erosion finishing of the laser formed rough holes.

7. In the process of claim 5, directing laser beam used for noncontact dressing and originating from the same source of laser energy as provided to form a rough hole in the part.

8. Apparatus for drilling and dressing parts comprising:

means defining a laser source;
means for directing a laser beam from the laser source to focus on a part for forming a rough hole therein;
means including a spark erosion wire electrode having a substantially unworn flat end configuration thereon for finishing the rough hole by spark eroding material therefrom;
and means for selectively diverting the laser beam from a hole drilling path to the part and for focusing the diverted laser beam on a worn tapered end of the wire electrode for dressing it to its original substantially unworn flat end configuration.

9. In the apparatus of claim 8, said diverting means including mirror means for directing the laser beam into a path offset with respect to such hole drilling path.

10. In the apparatus of claim 9, said mirror means including first, second and third mirrors, said first mirror directing the laser beam against said second mirror which in turn directs the laser beam in a path parallel to the hole drilling path, said third mirror directing the laser beam from such parallel path to a cutting plane perpendicular to the axis of the wire electrode.

11. In the apparatus of claim 9, said mirror means being selectively moveable to intercept the laser beam as it is directed toward the part for diverting it into a path parallel to the path of the hole drill path.

12. In the apparatus of claim 10, said first mirror being selectively moveable to intercept the laser beam as it is directed toward the part and for diverting it toward the second mirror for reflection therefrom in a path parallel to the hole drilling path of the laser beam.

13. Apparatus for drilling and dressing parts comprising:

means defining a laser source;
means including a spark erosion wire electrode having a substantially unworn flat tip thereon for forming holes by spark eroding material from a part and the flat tip erodable to a tapered end during hole formation;
and means for selectively diverting a laser beam from the source and focusing the diverted laser beam on the taper end of the wire electrode for dressing it to its original substantially unworn flat tip configuration.

* * * * *